INVENTOR
WILLIAM J. MILLER
BY
George J. Croninger
ATTORNEY

Nov. 29, 1949   W. J. MILLER   2,489,796
APPARATUS FOR FEEDING PLASTIC CERAMIC MATERIAL
TO MOLDS IN THE MANUFACTURE OF POTTERYWARE
Original Filed May 16, 1942   3 Sheets-Sheet 3

INVENTOR
WILLIAM J. MILLER
BY
George J. Groninger
ATTORNEY

Patented Nov. 29, 1949

2,489,796

UNITED STATES PATENT OFFICE 2,489,796

APPARATUS FOR FEEDING PLASTIC CERAMIC MATERIAL TO MOLDS IN THE MANUFACTURE OF POTTERY WARE

William J. Miller, Swissvale, Pa., assignor to Miller Pottery Engineering Company, Swissvale, Pa., a corporation of Pennsylvania Original application May 16, 1942, Serial No. 443,226. Divided and this application October 11, 1945, Serial No. 621,806

6 Claims. (Cl. 25—22)

1

This is a division of my co-pending application, Serial No. 443,226, filed May 16, 1942, Patent No. 2,450,437.

The present application has to do with that phase of the invention of my earlier application which relates to the feeding of plastic ceramic material to the molds of an automatic jiggering machine wherein the operation of the feeder is controlled by the operation of the machine.

In some respects, the feeding apparatus hereof is similar to that shown and described in the patent to William J. Miller et al. No. 2,301,906. However, the present invention contemplates improvements therein which are intended to simplify the structure and improve the operating efficiency thereof.

Figure 1:
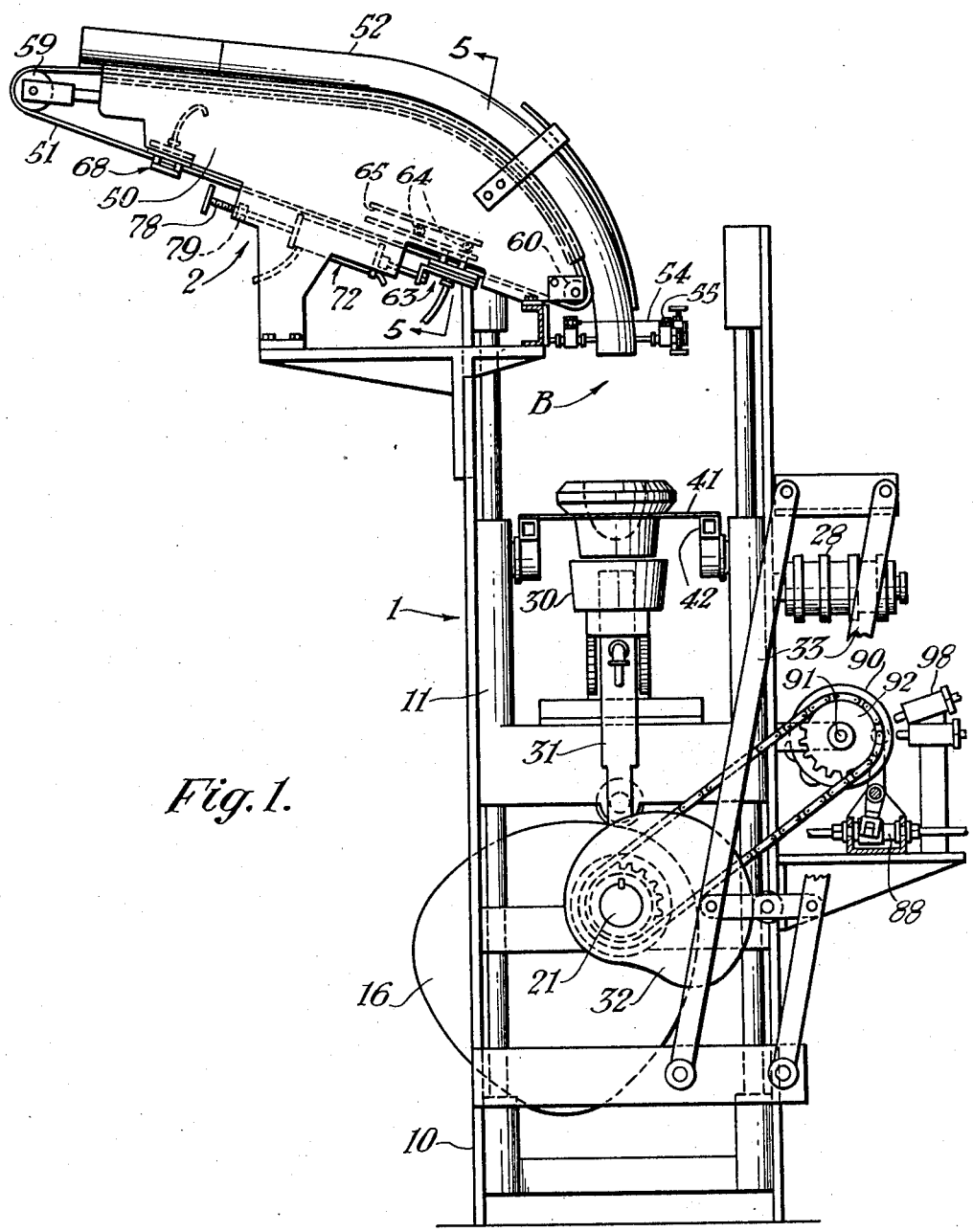
Figure 1 is a side elevation of the feeder hereof mounted on a fabricating machine.

With reference to Figure 1, the reference character 1 generally designates the fabricating machine, and 2 the feeder. This fabricating machine is of that type known in the art as an automatic jigger used to form dinnerware such as plates, cups, saucers and the like from plastic ceramic material. A detailed description of the jiggering machine 1 will be found in the parent of this divisional application.

Figure 2:
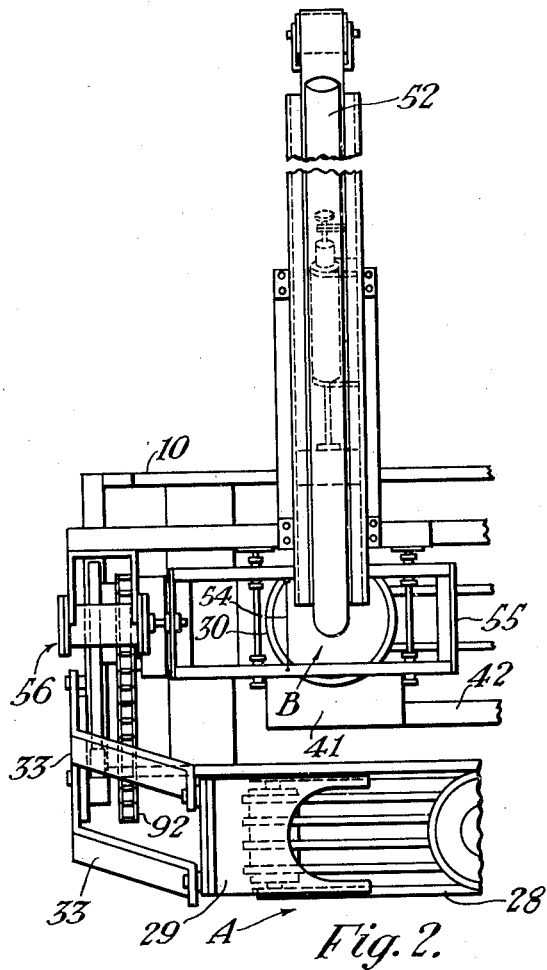
Figure 2 is a plan view of the apparatus shown in Figure 1.

As seen in Figure 2, the molds in or on which the ware is formed are progressed intermittently to a transfer station A where they enter a fork 29 that carries one mold at a time over to the center of the machine directly above a chuck 30 at the feeding position B.

The fabricating machine includes a frame 10, Figures 1 and 2, which supports for vertical reciprocation a crosshead 11 on which is supported a bracket 31 that in turn supports the chuck 30. A cam 32 on shaft 21 of the fabricating machine operates the fork 29 through parallel links 33. As the chuck 30 and crosshead 11 are raised by a cam 16 on shaft 21, the transfer fork 29 is shifted back to the mold conveyor 28 and a split

2 seat 41 forming part of a reciprocating transfer frame 42, Figure 2, is shifted under chuck 30 to receive the mold after it is charged with clay.

Clay charges are segregated from an elongated column of clay composed of one or more pugs 52, Figure 1. A receiver for the pug or pugs of clay, which are extruded by a pug mill and either manually or automatically cut off or placed upon the receiver, comprises a frame 50 adjustably mounted on the machine frame, having its upper surface formed like a trough in which the upper run of an endless conveyor belt 51 is disposed. The receiver trough has a horizontal, or nearly horizontal, loading position where additional pugs of clay are placed on the machine, and a downwardly curved portion leading to the molds at the feeding station B where the leading end of the pug is supported in substantially vertical position over the feeder chuck 30, and preferably in axial alignment with the vertical axis of the chuck and mold.

Figure 6:
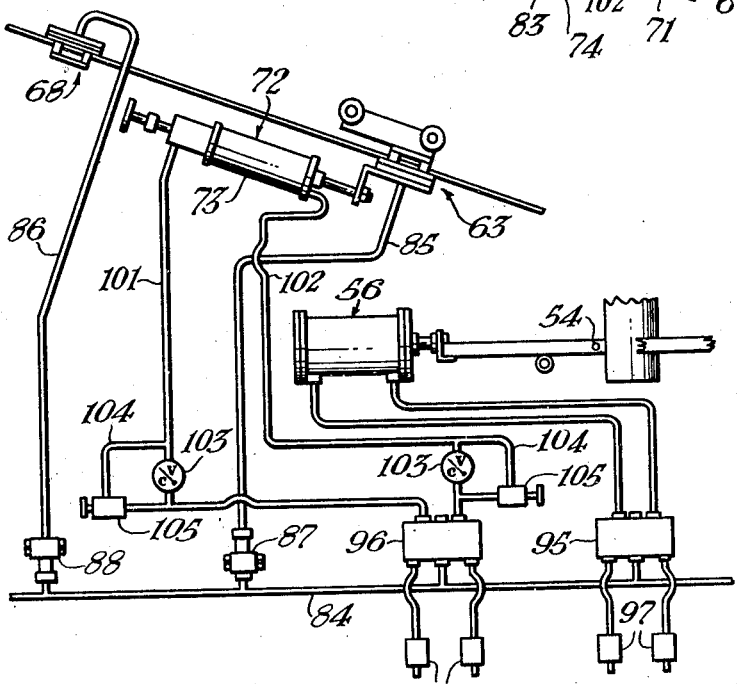
Figure 6 is a piping diagram showing the fluid system by means of which the feeder is operated and is controlled by the fabricating machine.

The conveyor belt 51 moves the clay toward the severing zone, which is between the mold chuck 30 and the lowermost end of the pug, where slices are cut therefrom by a cutting wire 54 stretched across a reciprocating frame 55 operated by a fluid motor 56, Figures 2 and 6.

Figure 5:
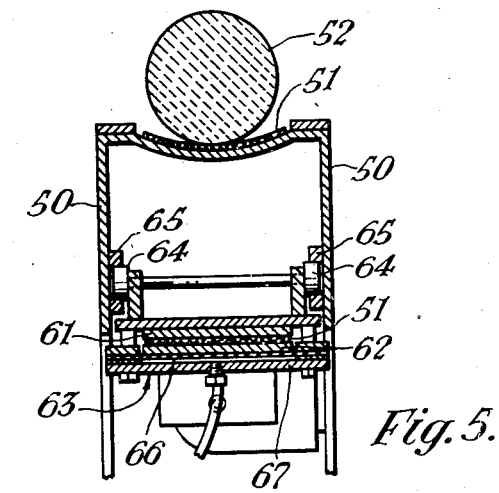
Figure 5 is a vertical section taken on the line 5—5 of Figure 1.
Figure 4:
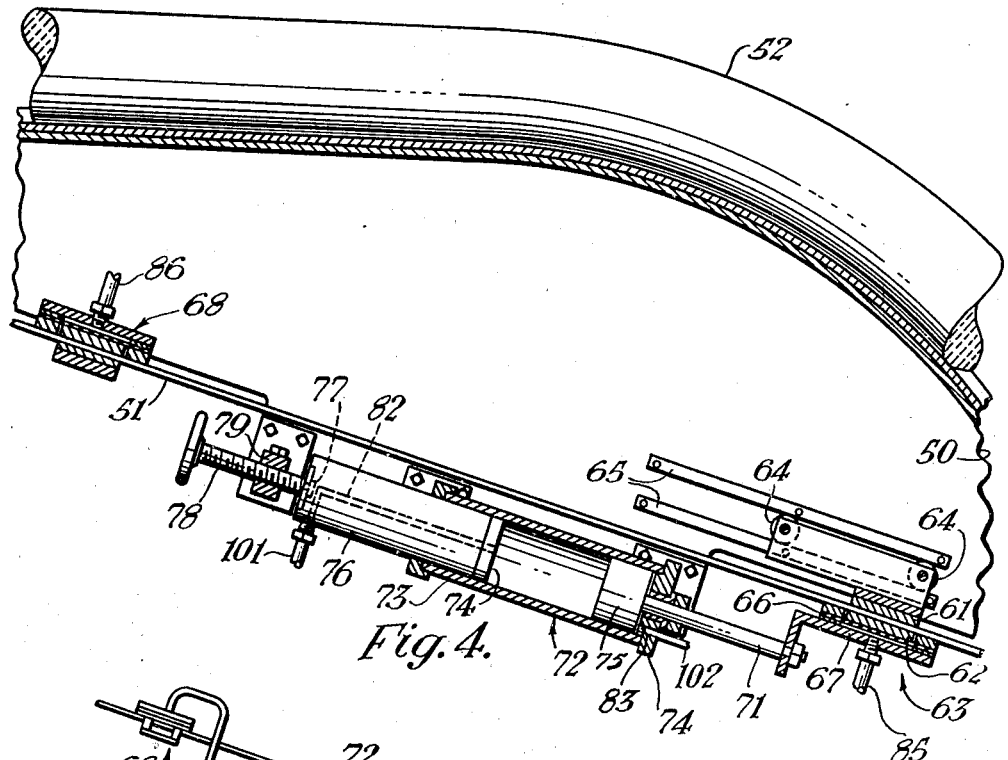
Figure 4 is an enlarged, fragmentary detail of the mechanism for moving the feeder belt.

Adjustable means are provided for operating the belt 51 whereby to accurately determine the desired bulk for the charges in accordance with the type of ware into which they are to be formed. For this purpose, the lower run of the belt 51 is tensioned between idler pulleys 59 and 60, Figure 1, and extends between an upper anvil plate 61 and a pneumatically operated gripping shoe 62 of a gripping head 63 mounted for reciprocation in parallelism with said run by means of rollers 64 thereon operating in guideways 65 of the frame 50 (Figures 4 and 5). The gripping shoe 62 is mounted on the upper flexible diaphragm wall 66, such as rubber, of an expansible chamber 67 of the gripping head, which, as the head is moved in one direction, is inflated to cause the shoe to clamp the belt upon the anvil plate to advance the belt therewith, the chamber being deflated upon the return stroke of the head to release the shoe from the belt. The belt is held from retracting with the gripping head 63 by a duplicate gripping head 68 which is fixedly mounted on the feeder frame 50, with its anvil plate arranged under the belt and operating to grip the belt when same is released from the head 63.

The gripping head 63 is connected with the piston rod 71 of a piston and cylinder type fluid motor 72 to be operated thereby. The cylinder 73 of the fluid motor is mounted on the feeder frame 50 and has an adjustable end wall 74 for limiting the stroke of the piston 75 of the motor in controlling the amount of advancement of the belt 51 in accordance with the clay bulk demand for the charges. The end wall 74 constitutes the inner end of a cylindrical core 76 in sealed telescoping engagement within the cylinder 73 and being adjustable into various positions therein by having a swiveling connection, as at 77, with the end of an adjusting screw 78 threaded in a bearing 79 of the frame 50. Fluid, such as air under pressure, may be admitted into the cylinder 73 at the core end thereof, in operating the piston 75 by way of a central port 82 in the core, air being admitted into the other cylinder end in a customary manner through a port 83.

Figure 3:
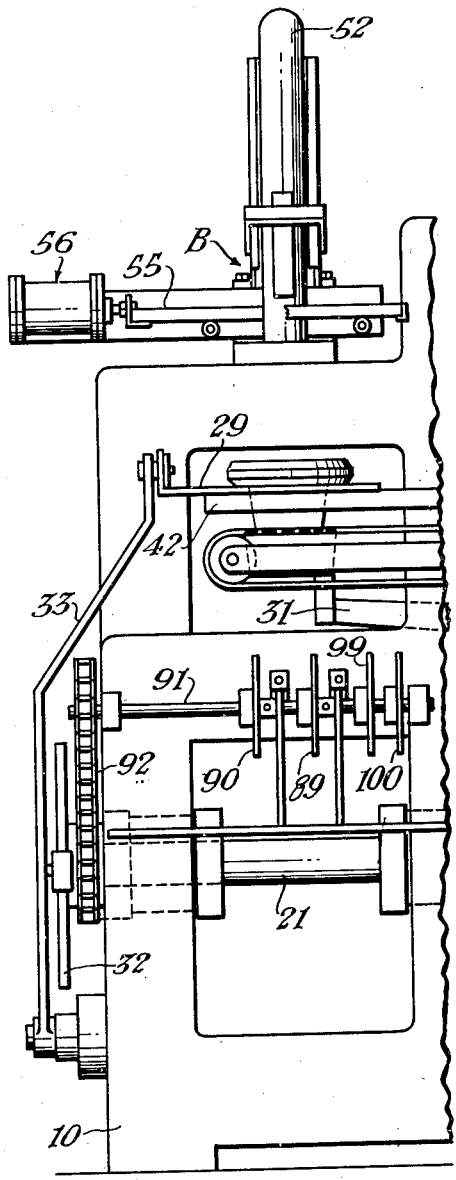
Figure 3 is a side elevation of the apparatus of Figure 1.

As seen in Figure 6, the various fluid pressure operated devices described may be energized from a main 84 through suitable valve means. To this end, the chambers of the gripping heads 63 and 68 are connected with said main 84 by way of conduits 85 and 86 and three-way valves 87 and 88 operated by similar cams 89 and 90 on a timer shaft 91 driven in uniform timed relation with the cam shaft 21 through a sprocket and chain connection 92 therebetween. (Figures 1 and 3.)

The ends of the charge-cutting motor 56 and slug feeding motor 72 are connected with the air pressure main through ordinary cylinder and piston type four-way valves 95 and 96 controlled by pairs of bleeder valves 97 and 98 operated by cams 99 and 100 on the timer shaft 91 (Figure 1). The speed of advance imparted by the motor 73 to the slug-feed gripping head 63 may be regulated so that excessive momentum will not be imparted to the slug when fed. This is accomplished by including in each of the conduits 101 and 102, connecting the ends of the cylinder of said motor with its valve 96, a check valve 103 and a by-pass 104 of the conduit therearound controlled by a needle valve 105 whereby air will be admitted to the cylinder ends by way of the check valve and exhausted by way of the needle valve so that the rate of flow of the exhausting air may be regulated.

It is desired, when making flatware, such as dinner plates, to use a pug of clay whose outside diameter is about two-thirds the diameter of the molding surface to thereby minimize the amount of spreading later on to expand the charge to full ware size. Obviously, the charge can be made the same diameter as the ware-forming surface and pressed against the mold later by a die to affix the clay thereto preparatory to jiggering. In this event, the charge would spread out beyond the molding surface. A mold with a ricket edge may be used to crack off any spare that spreads beyond the actual molding surface. Furthermore, in making coupes, nappies and the like, a smaller diameter, thicker charge may be used.

What I claim is:

1. Clay feeding apparatus comprising, a conveyor for carrying a pug of clay to a cutting off position, a horizontally movable cutting member at the cutting off position, a movable fluid pressure operated gripping device having a resilient diaphragm to be alternately expanded into gripping engagement with the conveyor and relaxed to release the conveyor from the gripping device, a stationary, fluid pressure operated gripping device including a resilient diaphragm to be alternately expanded into gripping engagement with the conveyor and relaxed to release the conveyor therefrom, and fluid pressure operated means for moving said movable fluid pressure operated gripping device.

2. Clay feeding apparatus comprising, a conveyor for carryng a pug of clay to a cutting off position, a horizontally movable cutting member thereat, a movable gripping device having a resilient diaphragm to be expanded by fluid pressure to cause the gripping device to grip the conveyor, a stationary gripping device having a resilient diaphragm to be expanded by fluid pressure to cause the device to grip the conveyor, fluid operated control means for alternately actuating said gripping devices, and fluid operated means for moving said movable gripping device with and relative to said conveyor.

3. Clay feeding apparatus comprising, a frame, a belt conveyor supported thereby for carrying a pug of clay to a cutting off position, a movable cutting member for slicing discs of clay from said pug, a movable gripping device having a resilient diaphragm and an anvil thereabove between which the belt passes, fluid pressure means for expanding said diaphragm to cause the belt to be pressed in non-slip relation against said anvil, a fluid motor beneath said frame having a piston rod connected to said gripping device, a stationary gripping device, spaced from the first named device provided with an anvil and a fluid pressure operated diaphragm therebetween through which the belt passes, means for alternately expanding said diaphragms, and means for operating said fluid motor when said movable gripping device is in gripping relation with the belt and when said movable gripping device is released therefrom.

4. Clay feeding apparatus comprising a frame, a belt conveyor carried by the frame for transporting a pug of clay to a cutting off position, a cutting member for slicing a disc of clay from said pug, fluid operated means for actuating said cutter, a stationary gripping device and a movable gripping device each having an anvil and a diaphragm to be expanded by fluid pressure to cause the belt to be gripped against an anvil, means for alternately operating said diaphragms and means for moving said movable gripping device when the diaphragm thereof is expanded to cause the belt to be moved and the pug advanced relative to the cutting member and for reversing the movement of the movable gripping device when its diaphragm is relaxed to cause the movable gripping head to be moved relative to the belt to initial position.

5. Clay feeding apparatus comprising, a conveyor for carrying a pug of clay to a cutting-off position, a cutter movable transversely of the pug at the cutting-off position, a reciprocable gripper having an element movable by fluid pressure alternately to and from gripping engagement with the conveyor, a stationary gripper having an element movable by fluid pressure alternately to and from gripping engagement with the conveyor, and fluid operated means for moving said movably-mounted gripper with and relative to said conveyor.

6. Clay feeding apparatus comprising, a frame, a belt conveyor carried by the frame for transporting a pug of clay to a cutting-off position, a cutter movable transversely of the pug for slicing discs of clay therefrom at the cutting-off position, a stationary gripper and a reciprocable gripper each having an anvil and an element adjacent to the anvil movable alternately to and from a position to grip the belt between the element and its adjacent anvil, fluid pressure means for operating said movable operating elements, and fluid pressure means for moving said reciprocable gripper in one direction when said movable element thereof is in gripping engagement with the belt to cause the belt to be moved and the pug thereby advanced toward said cutter and for moving said reciprocable gripper in the reverse direction when said movable element thereof is released from engagement with the belt to cause the reciprocable gripper to be moved relative to the belt to its initial position.

WILLIAM J. MILLER.

REFERENCES CITED

The following references are of record in the file of this patent:

UNITED STATES PATENTS

| Number | Name | Date |
|---|---|---|
| 1,695,327 | Goldston | Dec. 18, 1928 |
| 1,872,508 | Schutz et al. | Aug. 16, 1932 |
| 1,991,705 | Schreiber et al | Feb. 19, 1935 |
| 2,301,906 | Miller et al. | Nov. 10, 1942 |